United States Patent
Cusin et al.

(10) Patent No.: US 10,564,606 B2
(45) Date of Patent: Feb. 18, 2020

(54) COMPONENT FABRICATION METHOD INCLUDING A MODIFIED BURNISHING STEP

(71) Applicant: Nivarox-FAR S.A., Le Locle (CH)

(72) Inventors: Pierre Cusin, Villars-Burquin (CH); Davy Cretenet, La Chaux-de-Gilley (FR); Marc Stranczl, Nyon (CH); Raphael Garret, La Chaux-de-Fonds (CH)

(73) Assignee: Nivarox-FAR S.A., Le Locle (CH)

( * ) Notice: Subject to any disclaimer, the term of this patent is extended or adjusted under 35 U.S.C. 154(b) by 669 days.

(21) Appl. No.: 15/162,763

(22) Filed: May 24, 2016

(65) Prior Publication Data
US 2016/0370768 A1    Dec. 22, 2016

(30) Foreign Application Priority Data

Jun. 16, 2015   (EP) .................................... 15172322

(51) Int. Cl.
| | | |
|---|---|---|
| G04D 3/00 | (2006.01) | |
| B23K 26/324 | (2014.01) | |
| B23K 26/323 | (2014.01) | |
| B23K 103/18 | (2006.01) | |
| B23K 103/16 | (2006.01) | |

(52) U.S. Cl.
CPC .............. *G04D 3/00* (2013.01); *B23K 26/323* (2015.10); *B23K 26/324* (2013.01); *B23K 2103/172* (2018.08); *B23K 2103/18* (2018.08)

(58) Field of Classification Search
CPC ........ G04D 3/00; G04B 17/32; G04B 17/066; G04B 13/02; G04B 15/14; B23K 26/324; B23K 26/323; B23K 2103/172; B23K 2103/18
See application file for complete search history.

(56) References Cited

U.S. PATENT DOCUMENTS

| | | | |
|---|---|---|---|
| 2011/0103200 A1 | 5/2011 | Cusin | |
| 2016/0368093 A1* | 12/2016 | Cusin | ...................... G04B 17/34 |

FOREIGN PATENT DOCUMENTS

| | | |
|---|---|---|
| CH | 62393 | 11/1913 |
| CH | 229235 | 10/1943 |
| CH | 698 677 B1 | 9/2009 |
| DE | 441419 | 3/1927 |
| EP | 0 401 373 A1 | 12/1990 |
| EP | 2 107 433 A1 | 10/2009 |
| EP | 2 317 406 A1 | 5/2011 |
| WO | WO 2015/185423 A3 | 12/2015 |

OTHER PUBLICATIONS

European Search report dated Mar. 14, 2016 in European Application 15172322, filed on Jun. 16, 2015 ( with English Translation and Written Opinion ).

Felgentreu Von Gunter "Leistungsfahige Bauteile durch Oberflachen-Walztechnik", MTZ Motortechnische Zeitschrift, vol. 55, 1994, 5 pages.

\* cited by examiner

*Primary Examiner* — John C Hong

(74) *Attorney, Agent, or Firm* — Oblon, McClelland, Maier & Neustadt, L.L.P.

(57) ABSTRACT

The invention relates to a fabrication method for a part intended to be welded comprising a burnishing step for forming a perpendicular wall with respect to the surface undergoing burnishing intended to improve the flatness of the face to be welded.

10 Claims, 5 Drawing Sheets

US 10,564,606 B2

COMPONENT FABRICATION METHOD INCLUDING A MODIFIED BURNISHING STEP

This application claims priority from European Patent Application No 15172322.8 filed Jun. 16, 2015, the entire disclosure of which is hereby incorporated herein by reference.

FIELD OF THE INVENTION

The invention relates to a fabrication method including a modified burnishing step and, more specifically, a step of this type providing improved surface flatness.

BACKGROUND OF THE INVENTION

It is known from WO Publication No. 2015/185423 how to form a timepiece component from a part comprising a silicon-based or ceramic-based material which is welded by electromagnetic radiation directly onto another part, such as, for example, a metal or a metal alloy.

In the context of this development, it transpired that it was important for the gap between the parts not to exceed 0.5 micrometres, otherwise they could not be welded together.

SUMMARY OF THE INVENTION

It is an object of the present invention to overcome all of part of aforecited drawbacks by proposing a new fabrication method with at least one contact surface having improved flatness that enables parts to be assembled by welding.

Therefore, the invention relates to a timepiece component fabrication method including the following steps:
  taking a bar made from metal;
  profile turning the bar to form at least one diameter portion comprising a substantially vertical surface and a substantially horizontal surface;
  burnishing the bar to increase its hardness and improve its surface state and thereby obtain a first part made from metal;
  mounting a surface of the first part on a surface of a second part;
  welding, by laser electromagnetic radiation, the surface of the first part mounted on the surface of the second part, in order to secure them to each other;
  characterized in that, in the burnishing step, the burnisher is moved along the substantially vertical surface until the burnisher also enters into contact with the substantially horizontal surface, in order to polish said substantially horizontal surface when the burnisher is moved away from said substantially vertical surface.

Advantageously according to the invention, the fabrication method can offer a face with a perfectly flat perpendicular surface to ensure proper welding.

In accordance with other advantageous variants of the invention:
  the turning step also forms an oblique wall between the substantially vertical surface and the substantially horizontal surface to prevent a burr forming when the burnisher comes into contact with said substantially horizontal surface;
  the turning step also forms a curved wall around said substantially horizontal surface to prevent a burr forming when the burnisher comes into contact with said substantially horizontal surface.
  the second part is made from silicon or from ceramic;
  the second part also includes at least a partial coating of metal, silicon oxide, silicon nitride, silicon carbide or an allotrope of carbon;
  the first metal-based part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

The invention relates to a component formed using a material having no usable plastic range i.e. with a very limited plastic range, with a second part comprising the same type of material or a different type of material.

This component was devised for applications in the field of horology and is rendered necessary by the increasing part played by fragile, brittle materials, such as silicon-based or ceramic-based materials. It is possible, for example, to envisage forming a case, a dial, a flange, a crystal, a bezel, a push-button, a crown, a case back, a hand, a bracelet or strap, a balance spring, a balance wheel, a pallets, a bridge or bar, an oscillating weight or even a wheel, such as an escape wheel, entirely or partially from fragile or brittle materials.

Preferably, the silicon-based material used to make the compensated balance spring may be single crystal silicon, regardless of its crystal orientation, doped single crystal silicon, regardless of its crystal orientation, amorphous silicon, porous silicon, polycrystalline silicon, silicon nitride, silicon carbide, quartz, regardless of its crystal orientation, or silicon oxide. Of course, other materials may be envisaged, such as glass, ceramics, cermets, metals or metal alloys. Further, the first silicon-based part may also optionally include at least one partial coating of silicon oxide, silicon nitride, silicon carbide or an allotrope of carbon, depending upon the intended applications of the timepiece component.

As explained above, the other part may include the same type of material or another type of material. Therefore, preferably, the other part is metal-based and may include an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

Figure 1:
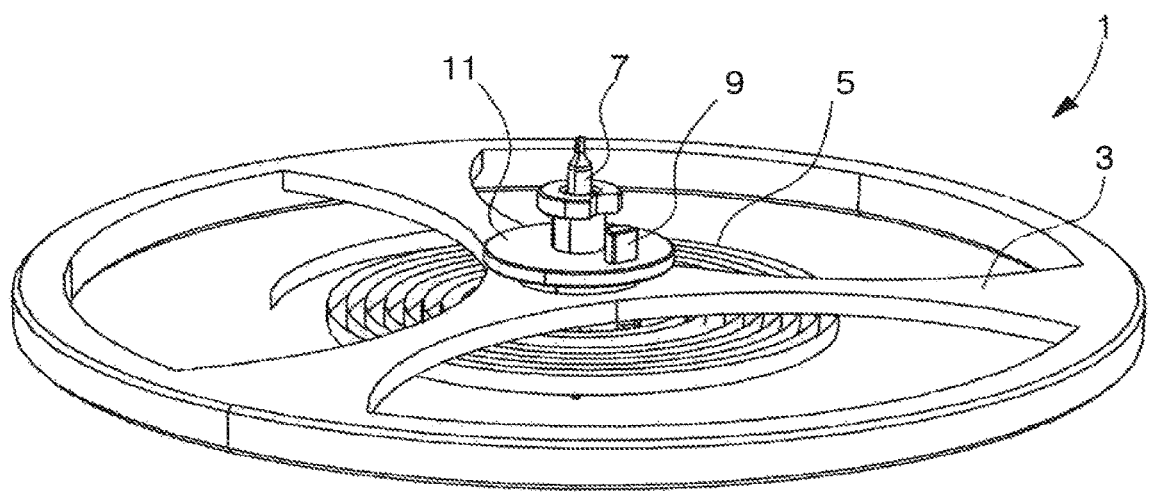
FIG. 1 is a perspective view of a sprung balance resonator.

For the sake of simplicity, the explanation below will concern an assembly between a balance spring and a balance staff. FIG. 1 shows a resonator 1 wherein the balance spring 5 is used for temperature compensation of the entire resonator assembly 1, i.e. all the parts and particularly the balance wheel 3 mounted on the same balance staff 7. Resonator 1 cooperates with a maintenance system, such as, for example, a Swiss lever escapement (not shown) cooperating with the impulse pin 9 of table-roller 11 which is also mounted on staff 7.

Figure 2:
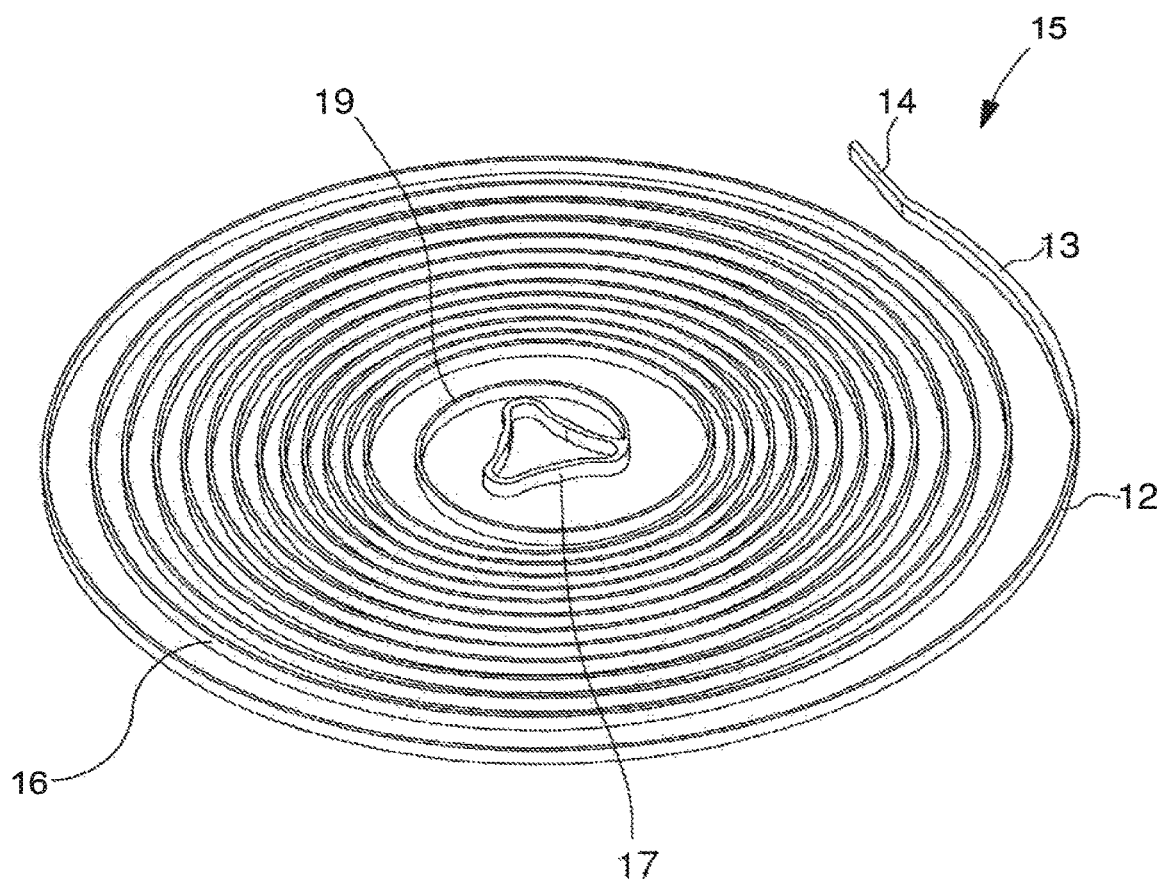
FIG. 2 is a perspective view of a balance spring according to the invention.

A compensating balance spring 15 is shown more clearly in FIG. 2. It includes a single strip 16 wound on itself between an inner coil 19 integral with a collet 17 and an outer coil 12 comprising an end 14 intended to be pinned up to the stud. As seen in FIG. 2, in order to improve the isochronism of the resonator in which balance spring 15 is used, the latter includes an inner coil 19 comprising a Grossmann curve and an outer coil 12 comprising a portion 13 that is thickened relative to the rest of balance spring 15. Finally, it can be seen that collet 17 comprises a single strip extending in a substantially triangular shape so that the collet exhibits elasticity when it is fitted onto the staff, in particular to enable it to be centred relative to the staff.

Figure 3:
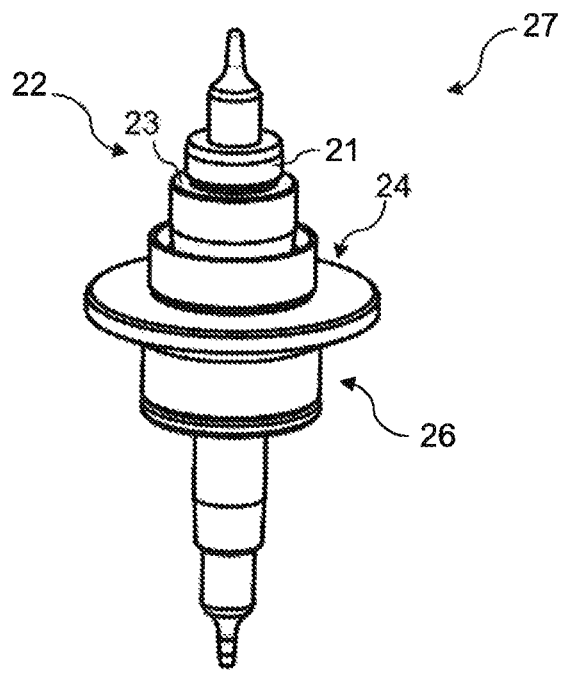
FIG. 3 is a perspective view of a balance staff according to the invention.

A staff 27 is illustrated more clearly in FIG. 3. It includes, in particular, several diameter portions 22, 24, 26 respectively intended to receive the balance spring, the balance wheel and the table-roller. As illustrated in FIG. 3, diameter portion 22 includes a cylindrical shaft 21, the lower portion of which is edged with a shoulder 23.

Figure 4:
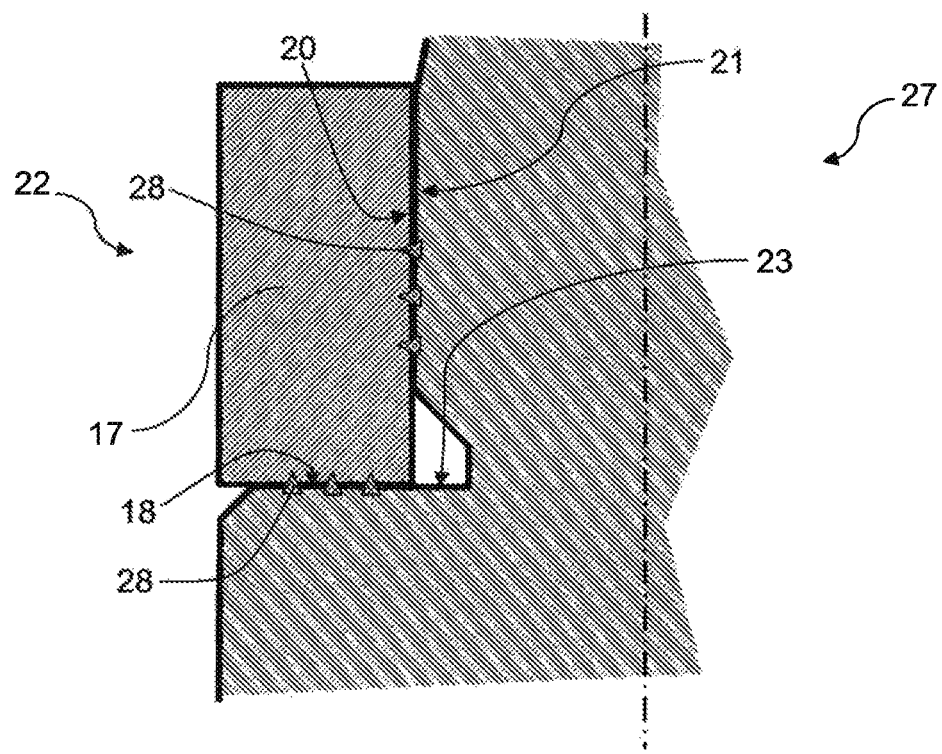
FIG. 4 is a cross-sectional view of an assembly according to WO Publication No. 2015/185423.

As illustrated in FIG. 4, diameter portion 22 is intended to receive, between shaft 21 and shoulder 23, collet 17 of balance spring 15. More specifically, the inner face 20 of collet 17 is resiliently pressed against the outer surface of shaft 21 and the lower face 18 of collet 17 is pressed against shoulder 23. Finally, as indicated at reference 28, shaft 21 and/or shoulder 23 are welded to collet 17 in accordance with the teaching of WO Publication No. 2015/185423.

However, within the context of developing the teaching of WO Publication No. 2015/185423, it very soon became clear that the gap between the parts must not exceed 0.5 micrometres, otherwise they cannot be welded together.

The method according to the first embodiment of the invention therefore includes a first step of taking a bar able to withstand profile-turning. As the example relates to an assembly between a balance spring and a balance staff, the bar may be made from a metal or from a metal alloy.

Figure 5:
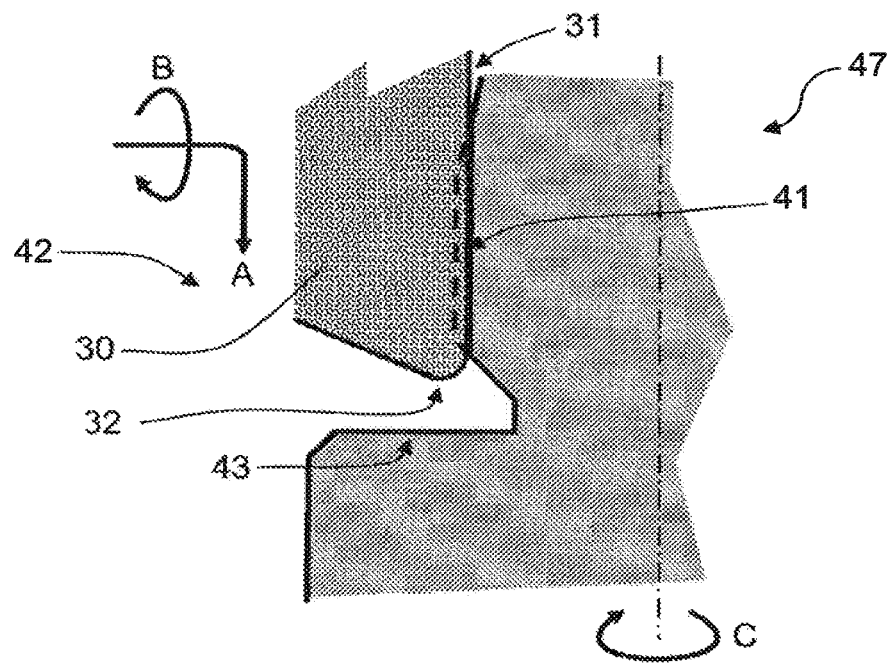
FIGS. 5 and 6 are cross-sectional views of a burnishing operation according to a first embodiment of the invention.

The second step is intended to profile-turn the various diameter portions required to form balance staff 47 and particularly diameter portion 42 for receiving collet 17 of balance spring 15. In FIG. 5, it can be seen that diameter portion 42 includes a substantially vertical surface 41 forming a preform of the shaft and a substantially horizontal surface 43 forming a preform of the shoulder.

The method continues with a third step intended to burnish the substantially vertical surface 41 to increase its hardness and improve its surface state and thus form shaft 41'. Advantageously according to the invention, in a first phase of the burnishing step, the burnisher 30 rotatably mounted about B is displaced in direction A in contact, via its main face 31, along the length of substantially vertical surface 41, also rotatably mounted about C as seen in FIG. 5.

Figure 6:
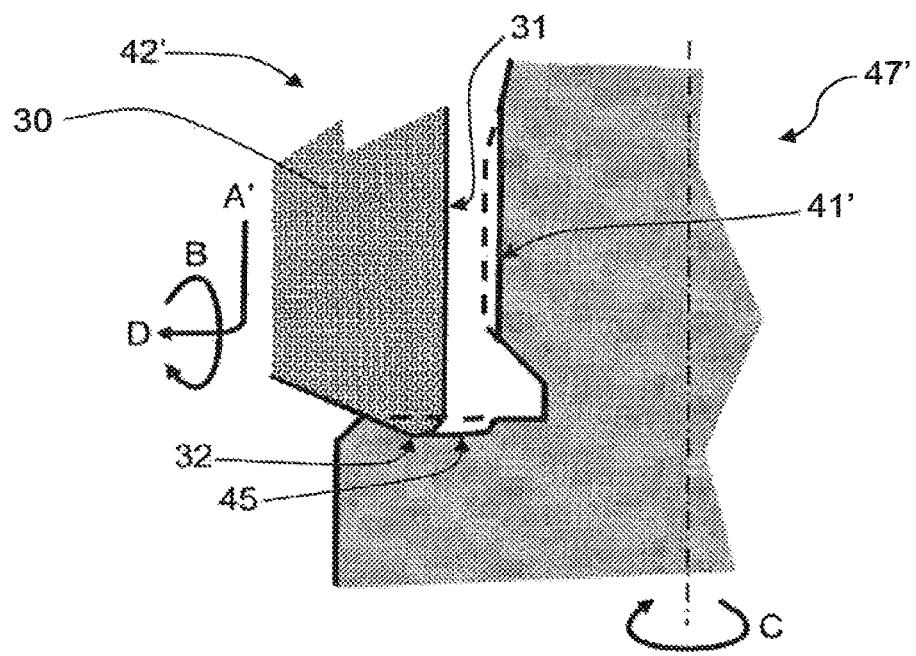

Further, in a second phase of the burnishing step, burnisher 30 continues its displacement in direction A' until burnisher 30 also enters into contact, via its side face 32, with substantially horizontal surface 43. It is thus understood that the side face 32 of burnisher 30 will polish substantially horizontal surface 43 when burnisher 30 is moved in direction D away from said substantially vertical surface formed by shaft 41', forming a perfectly flat and horizontal shoulder 45 as seen in FIG. 6.

Thus, after a finishing step including, for example, a deburring step, the staff 47' obtained offers a perfectly flat welding surface 45 ensuring proper welding with another part, as taught in WO Publication No. 2015/185423.

In a fourth step of the method, collet 17 is then fitted onto diameter portion 42', i.e. the inner face 20 of collet 17 is resiliently pressed against the surface of shaft 41' and lower face 18 of collet 17 is pressed against the surface of shoulder 45.

Finally, in a final welding step, at least one portion of inner face 20 and/or lower face 18 of collet 17 is laser welded onto shaft 47' with the assurance that balance spring 15 and staff 47' are secured to each other.

The method according to the second embodiment of the invention includes a first step of taking a bar able to withstand profile-turning. As the example relates to an assembly between a balance spring and a balance staff, the bar may be made from a metal or from a metal alloy.

Figure 7:
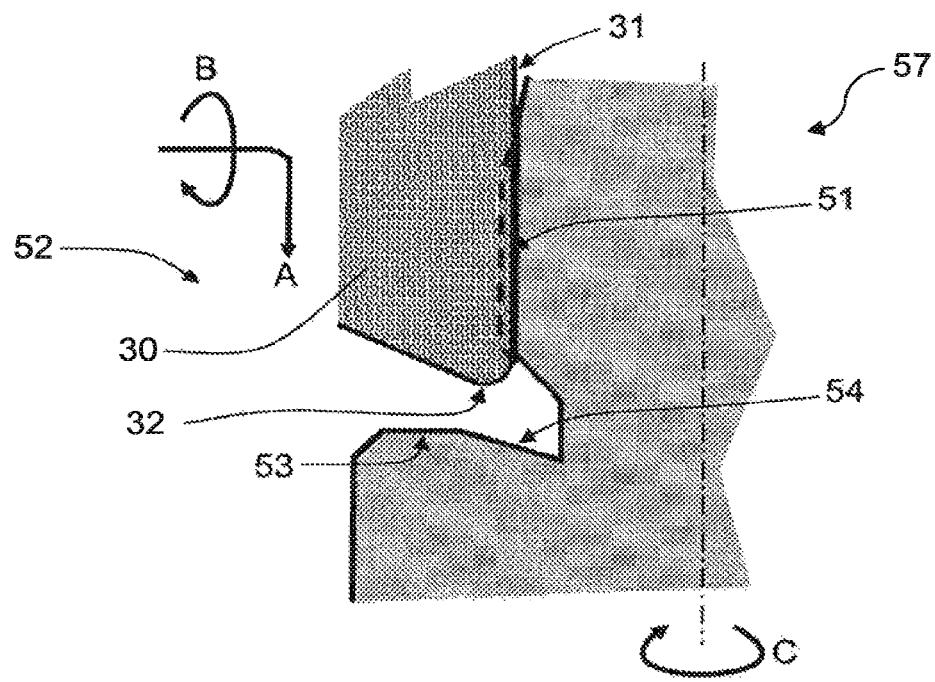
FIGS. 7 and 8 are cross-sectional views of a burnishing operation according to a second embodiment of the invention.

The second step is intended to profile-turn the various diameter portions required to form balance staff 57 and particularly diameter portion 52 for receiving collet 17 of balance spring 15. In FIG. 7 it can be seen that diameter portion 52 includes a substantially vertical surface 51 forming a preform of the shaft and a substantially horizontal surface 53 forming a preform of the shoulder.

As seen in FIG. 7, in comparison to FIG. 5, the profile-turning step is deliberately intended to form an oblique wall 54 starting from the undercut made by the turning tool towards substantially horizontal surface 53, which is again substantially perpendicular to the substantially vertical surface 51, but in a much more limited width than surface 43 of FIG. 5. It is understood that, in the case of the staff, oblique wall 54 thus forms a cone.

The method continues with a third step intended to burnish the substantially vertical surface 51 to increase its hardness and improve its surface state and thus form shaft 51'. Advantageously according to the invention, in a first phase of the burnishing step, the burnisher 30 rotatably mounted about B is displaced in direction A in contact, via its main face 31, along the length of substantially vertical surface 51, also rotatably mounted about C as seen in FIG. 7.

Figure 8:
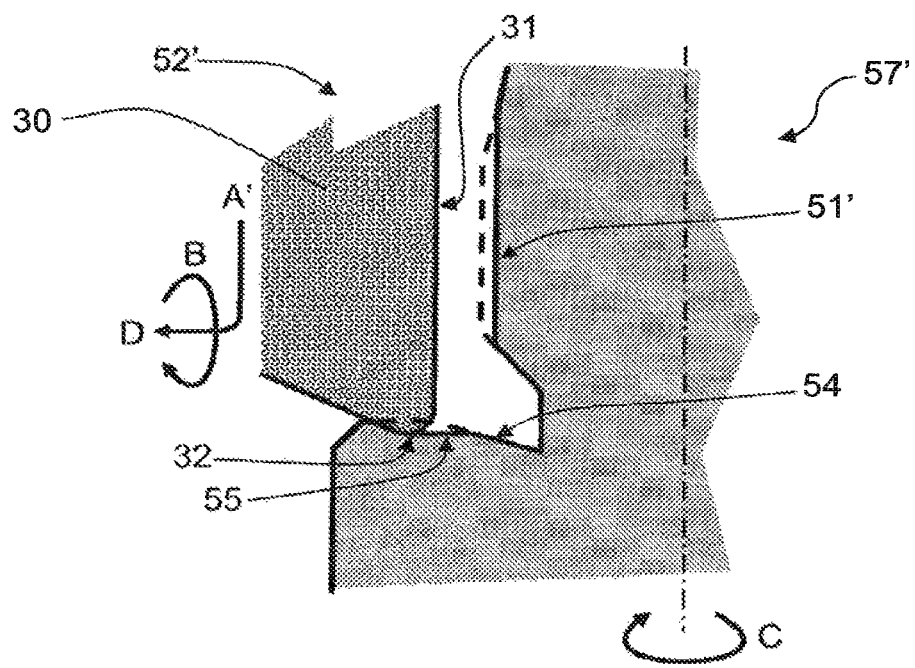

Further, in a second phase of the burnishing step, burnisher 30 continues its displacement in direction A' until burnisher 30 also enters into contact, via its side face 32, with substantially horizontal surface 53. It is thus understood that the side face 32 of burnisher 30 will polish substantially horizontal surface 53 when burnisher 30 is moved in direction D away from said substantially vertical surface formed by shaft 51', forming a perfectly flat and horizontal shoulder 55 as seen in FIG. 8.

Thus, after a finishing step including, for example, a deburring step, the staff 57' obtained offers a perfectly flat welding surface 55 ensuring proper welding with another part, as taught in Patent document WO Publication No. 2015/185423. It is also seen that, in comparison with the first embodiment, the second embodiment prevents the formation of burrs between preform 43 and the final shoulder 45 as seen in FIG. 6.

In a fourth step of the method, collet 17 is then fitted onto diameter portion 52', i.e. inner face 20 is against the surface of shaft 51' and its lower face 18 is against the surface of shoulder 55.

Figure 9:
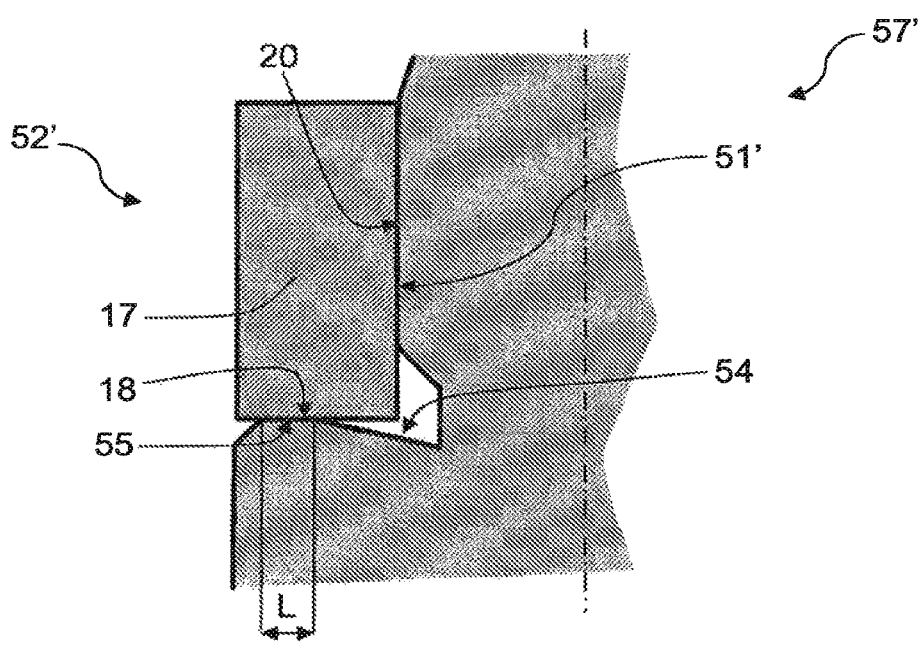
FIG. 9 is a cross-sectional view of an assembly according to the invention.

Finally, in a final welding step, at least one portion of inner face 20 and/or lower face 18 of collet 17 is laser welded onto shaft 57' with the assurance that balance spring 15 and staff 57' are secured to each other, as illustrated in FIG. 9. It will also be noted that, in comparison with the first embodiment, the second embodiment can offer a welding surface of shoulder 55 reduced to a width L which is incidentally much less prone to problems of flatness.

Of course, the present invention is not limited to the illustrated example but is capable of various variants and modifications that will appear to those skilled in the art. In particular, the burnisher 30 is not limited to the burnisher presented in this specification. Indeed, depending on the desired applications, it could be of different geometry to obtain different surfaces.

Further, as an alternative to the oblique wall 54 of the second embodiment, the profile turning step could be intended to deliberately form a curved wall starting from the undercut made by the turning tool. It is understood that, in this alternative, the curved wall would thus form a toric surface instead of a flat surface 53 followed by a cone 54, as in the second embodiment.

What is claimed is:

1. A method for fabrication of a timepiece component comprising:
   selecting a metal bar;
   forming at least one diameter portion including a substantially vertical surface and a substantially horizontal surface based on a profile turning of the metal bar;
   forming a first metal part based on a burnishing of the metal bar, the burnished metal bar having increased hardness and improved surface state than the metal bar, wherein a burnisher is moved along the substantially vertical surface of the at least one diameter portion until the burnisher is in contact with the substantially horizontal surface of the at least one diameter portion, and the substantially horizontal surface of the at least one diameter portion is polished when the burnisher is moved away from the substantially vertical surface of the at least one diameter portion;
   mounting a surface of the first metal part on a surface of a second part; and
   welding, by laser electromagnetic radiation, the surface of the metal first part mounted on the surface of the second part, the first metal part being secured to the second part.

2. The method according to claim 1, wherein the second part includes silicon or ceramic.

3. The method according to claim 2, wherein the second part further includes at least a partial coating of metal, silicon oxide, silicon nitride, silicon carbide or an allotrope of carbon.

4. The method according to claim 1, wherein the first metal part is made from a metal includes ail iron alloy, a copper alloy, nickel or an alloy thereof, titanium or an alloy thereof, gold or an alloy thereof, silver or an alloy thereof platinum or an alloy thereof ruthenium or an alloy thereof, rhodium or an alloy thereof, or palladium or art alloy thereof.

5. The method according to claim 1, wherein a side face of the burnisher is configured to polish the substantially horizontal surface of the at least one diameter portion.

6. The method according to claim 1, wherein the at least one diameter portion is configured to receive a balance spring, a balance Wheel, and a table-roller of the timepiece component.

7. The method according to claim 1, wherein the at least one diameter portion further includes a cylindrical shaft and a shoulder, a lower portion of the cylindrical shaft being edged with the shoulder.

8. The method according to claim 1, wherein a side face of the burnisher is configured to polish the substantially horizontal surface of the at least one diameter portion.

9. The method according to claim 1, wherein the first metal part is a balance staff.

10. The method according to claim 1, wherein the second part is a collet.

* * * * *